United States Patent
Xia et al.

(10) Patent No.: US 12,407,776 B2
(45) Date of Patent: *Sep. 2, 2025

(54) METHODS AND APPARATUS FOR BYPASSING HOLDS

(71) Applicant: GOOGLE LLC, Mountain View, CA (US)

(72) Inventors: Cassandra Xia, Atherton, CA (US); Luis Carlos Cobo Rus, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/745,469

(22) Filed: Jun. 17, 2024

(65) Prior Publication Data
US 2024/0340373 A1 Oct. 10, 2024

Related U.S. Application Data

(63) Continuation of application No. 18/199,711, filed on May 19, 2023, now Pat. No. 12,015,736, which is a continuation of application No. 17/743,126, filed on May 12, 2022, now Pat. No. 11,677,871, which is a
(Continued)

(51) Int. Cl.
*H04M 3/428* (2006.01)
*H04M 1/72436* (2021.01)
*H04M 1/82* (2006.01)

(52) U.S. Cl.
CPC ..... *H04M 3/4286* (2013.01); *H04M 1/72436* (2021.01); *H04M 1/82* (2013.01); *H04M 3/4285* (2013.01); *H04M 2201/40* (2013.01)

(58) Field of Classification Search
CPC ............. H04M 3/4286; H04M 3/4285; H04M 2201/40
(Continued)

(56) References Cited

U.S. PATENT DOCUMENTS 5,309,505 A 5/1994 Szlam et al.
5,315,636 A 5/1994 Patel
(Continued)

FOREIGN PATENT DOCUMENTS

CN 101202992 6/2008
CN 102972015 3/2013
(Continued)

OTHER PUBLICATIONS

European Patent Office, Intention to Grant issued in Application No. 23150804.5, 48 pages, dated Jun. 19, 2024.
(Continued)

*Primary Examiner* — Thjuan K Addy
(74) *Attorney, Agent, or Firm* — Gray Ice Higdon

(57) ABSTRACT

Automated monitoring of a voice communication session, when the session is in an on hold status, to determine when the session is no longer in the on hold status. When it is determined that the session is no longer in the on hold status, user interface output is rendered that indicates that the on hold status of the session has ceased. In some implementations, an audio stream of the session can be monitored to determine, based on processing of the audio stream, a candidate end of the on hold status. In response, a response solicitation signal is injected into an outgoing portion of the audio. The audio stream can be further monitored for a response (if any) to the response solicitation signal. The response (if any) can be processed to determine whether the end of the on hold status is an actual end of the on hold status.

14 Claims, 6 Drawing Sheets

Related U.S. Application Data continuation of application No. 17/120,956, filed on Dec. 14, 2020, now Pat. No. 11,336,767, which is a continuation of application No. 16/610,169, filed as application No. PCT/US2018/040065 on Jun. 28, 2018, now Pat. No. 10,897,535.

(58) Field of Classification Search
USPC ............ 379/215.01, 201.01, 211.01, 207.02, 379/212.01, 88.01
See application file for complete search history.

(56) References Cited

U.S. PATENT DOCUMENTS

| | | | |
|---|---|---|---|
| 8,619,965 | B1 | 12/2013 | Figa et al. |
| 10,897,535 | B2 | 1/2021 | Xia et al. |
| 11,336,767 | B2 | 5/2022 | Xia et al. |
| 11,677,871 | B2 | 6/2023 | Xia et al. |
| 2004/0203660 | A1 | 10/2004 | Tibrewal et al. |
| 2005/0147227 | A1 | 7/2005 | Chervirala et al. |
| 2007/0038443 | A1* | 2/2007 | Thyssen ............ H04M 1/72448 704/233 |
| 2007/0047711 | A1 | 3/2007 | Florkey et al. |
| 2008/0130865 | A1 | 6/2008 | Boss |
| 2008/0158000 | A1 | 7/2008 | Mattrazzo |
| 2008/0317234 | A1 | 12/2008 | Di Fabbrizio et al. |
| 2009/0136014 | A1 | 5/2009 | Bigue et al. |
| 2010/0303227 | A1 | 12/2010 | Gupta |
| 2012/0139726 | A1 | 6/2012 | Brunson et al. |
| 2014/0063175 | A1 | 3/2014 | Jafry |
| 2015/0163610 | A1 | 6/2015 | Sampat et al. |
| 2015/0189089 | A1 | 7/2015 | Iltus |
| 2016/0021247 | A1 | 1/2016 | Marimuthu et al. |
| 2016/0191702 | A1 | 6/2016 | Gabbai |
| 2020/0344351 | A1 | 10/2020 | Xia et al. |
| 2021/0099575 | A1 | 4/2021 | Xia et al. |
| 2022/0272191 | A1 | 8/2022 | Xia et al. |
| 2023/0308542 | A1 | 9/2023 | Xia et al. |

FOREIGN PATENT DOCUMENTS

| | | |
|---|---|---|
| JP | 2004304299 | 10/2004 |
| JP | 2015220755 | 12/2015 |
| JP | 2019525527 | 9/2019 |
| WO | 2020005260 | 1/2020 |

OTHER PUBLICATIONS

China National Intellectual Property Administration; Notification of First Office Action issued in Application No. 202210232401.4; 21 pages; dated Jun. 28, 2024.

Japanese Patent Office; Notice of Reasons of Rejection issued in Application No. 2023-097188, 10 pages, dated Nov. 14, 2024.

China National Intellectual Property Administration; Notice of Grant issued in Application No. 202210232401.4; 4 pages; dated Dec. 23, 2024.

Intellectual Property India; Hearing Notice issued in Application No. 202027052359; 2 pages; dated Feb. 9, 2024.

Japanese Patent Office; Notice of Reasons of Rejection issued in Application No. 2020-569973, 12 pages, dated May 9, 2022.

European Patent Office; Intention to Grant issued in Application No. 18743295.0, 48 pages, dated Jul. 29, 2022.

Japanese Patent Office; Notice of Reasons for Rejection issued in Application No. 2020-569973, 6 pages, dated Dec. 12, 2022.

European Patent Office; Extended European Search Report issued in Application No. EP 23150804.5-1213; 7 pages; dated Apr. 21, 2023.

International Search Report and Written Opinion issued is Application No. PCT/US2018/040065 dated Mar. 6, 2019.

China National Intellectual Property Admininstration; Notification of First Office Action issued in Application No. 201880094616.6; 29 pages; dated Apr. 8, 2021.

China National Intellectual Property Admininstration; Notification of Second Office Action issued in Application No. 201880094616.6; 17 pages; dated Aug. 9, 2021.

The Korean Intellectual Property Office; Notice of Office Action issued in Application No. 10-2020-7037020; 6 pages; dated Aug. 30, 2021.

The Korean Intellectual Property Office; Notice of Allowance issued in Application No. 10-2020-7037020; 3 pages; dated Sep. 29, 2021.

Intellectual Property India; Examination Report issued in Application No. 202027052359; 6 pages; dated Dec. 14, 2021.

China National Intellectual Property Administration: Notice of Grant issued for Application No. 201880094616.6 dated Dec. 27, 2021. 4 pages.

The Korean Intellectual Property Office; Notice of Allowance issued in Application No. 10-2021-7042192, 3 pages, dated Mar. 29, 2022.

* cited by examiner

METHODS AND APPARATUS FOR BYPASSING HOLDS

BACKGROUND

Humans can engage in voice communication sessions (such as telephone calls) using a variety of client devices. When an individual (referred to herein as a "caller" or "user") calls a particular number and no one is currently available to take the call, many organizations can place the caller in an on hold status. An on hold status indicates the caller is waiting to interact with a live person (also referred to herein as a "user"). Music is frequently played for a user while they are waiting on hold. Additionally, the music can be interrupted by a variety of human recorded voices which can provide additional information such as information about the organization the user called (e.g., the website for the organization, the normal business hours for the organization, etc.). Additionally, automated voices can update the user with an estimated remaining wait time to indicate how much longer the user will remain on hold.

When a call is on hold, a caller has to closely monitor the call to determine when a second user, such as a service representative, becomes active in the call. For example, when on hold music switches to a human voice, a caller must determine if the voice they are hearing is a prerecorded voice or is a live service representative. To enable close monitoring of an on hold call initiated via a client device, a caller may turn up the call volume, place the audio output of the call in a speakerphone modality, and/or repeatedly activate a screen of the client device while the call is on hold (to check to ensure the call is still active and on hold). Those and/or other on hold monitoring activities of the caller can increase power consumption of the client device. For example, such activities can increase power consumption of a mobile phone being utilized for the call, which can cause expedited drain on the battery of the mobile phone. Additionally, those and/or other on hold monitoring activities can require the caller to make a large quantity of inputs at the client device, such as inputs to increase the volume, activate a speakerphone modality, and/or activate the screen.

SUMMARY

Implementations described herein relate to automated monitoring of a voice communication session, when the session is in an on hold status, to determine when the session is no longer in the on hold status. When it is determined that the session is no longer in the on hold status, user interface output is rendered that is perceptible to a calling user that initiated the session, and that indicates that the on hold status of the session has ceased. In various implementations, an on hold client (e.g., that operates at least in part on a client device that initiated the voice communication session) can be utilized to monitor at least an incoming portion of an audio stream of the session to determine when the session is no longer in the on hold status. In some of those various implementations, the on hold client determines, based on processing of the audio stream, a candidate end of the on hold status. The candidate end of the on hold status can be based on detecting the occurrence of one or more events in the audio stream. As some non-limiting examples, the candidate end of the on hold status can be based on detecting a transition in the audio stream (e.g., any transition or a transition from "on hold music" to a human voice), detecting any human voice (e.g., using voice activity detection), detecting a new human voice (e.g., using speaker diarization), detecting the occurrence of certain terms and/or phrases (e.g., "hello", "hi", and/or a name of the calling user), and/or other event(s).

In some version of those various implementations, the on hold client causes a response solicitation signal to be injected into an outgoing portion of the audio stream (so that it can be "heard" by the called party) in response to detecting the candidate end of the on hold status. The response solicitation signal can be a recorded human voice speaking one or more words or a synthetically generated voice speaking the one or more words. The one or more words can be, for example, "Hello", "Are you there", "Hi, are you on the line", etc. The on hold client can further monitor for a response (if any) to the response solicitation signal and determine whether the response indicates that the candidate end of the on hold status is an actual end of the on hold status. If so, the on hold client can cause user interface output to be rendered that is perceptible to a calling user that initiated the session, and that indicates that the on hold status of the session has ceased (i.e., that the voice communication session is no longer on hold). If not, the on hold client can continue to monitor for another occurrence of a candidate end of the one hold status. In some implementations, the on hold client determines whether the response indicates that the candidate end of the on hold status is an actual end of the on hold status based on determining a likelihood that the response is a human voice; based on converting the response to text (e.g., using a speech-to-text processor) and determining whether the text is responsive to the response solicitation signal; based on determining that the response is not a pre-recorded voice (e.g., includes voice characteristic(s) that are distinct from those of pre-recorded voice(s) for the voice communication session); and/or based on other criterion/criteria. The on hold client can optionally utilize a trained machine learning model in determining a likelihood that the response is a human voice.

In these and other manners, the on hold client can monitor the incoming portion of an audio stream of an on hold session and dynamically determine when to provide a response solicitation signal. Further, the on hold client can utilize a response (if any) to the response solicitation signal in determining whether the on hold status of the session has ceased. These actions by the on hold client can be performed without any intervention from the calling user and without necessitating the client device to audibly render the audio stream of the voice communication session. Further, as described herein, in various implementations the on hold client can be initiated automatically (without any user input being required) or with minimal user input (e.g., with a single-tap of a graphical element, or a single spoken command).

A voice communication session can utilize a variety of protocols and/or infrastructures such as Voice over Internet Protocol (VOIP), a public switched telephone network (PSTN), a private branch exchange (PBX), any of a variety of video and/or audio conferencing services, etc. In various implementations, a voice communication session is between a client device of a calling user (that initiates the voice communication session) and one or more devices of a called party. The voice communication session enables bidirectional audio communication between the calling user and the called party. The voice communication session can be a direct peer-to-peer session between the client devices of the calling user and the device(s) of the called party, and/or can be routed through various servers, networks, and/or other resources. Voice communication sessions can occur between a variety of devices. For example, a voice communication session can be between: a client device (e.g., a mobile phone, a standalone interactive speaker, a tablet, a laptop) of a calling user and a landline telephone of a called party; a client device of a calling user and a client device of a called party; a client device of a calling user and a PBX of a called party; etc.

In some implementations described herein, an on hold client, operating at least in part on a client device, can be initiated in response to the client device detecting a voice communication session (initiated by the client device) has been placed on hold. Client devices, such as mobile phones, can examine the audio stream of the voice communication session and determine the session is on hold in a variety of ways. As one example, a client device can determine a session is on hold based on detecting music in an incoming portion of the audio stream, such as typical "on hold music". For instance, an incoming portion of the audio stream can be processed and compared to a list of known on hold music (e.g., audio characteristics of the audio stream can be compared to audio characteristics of known on hold music) to determine whether the incoming portion of the audio stream is typical on hold music. Such a list can be stored locally on the client device and/or on a remote server the client device can connect to via a network (e.g., a cellular network). Additionally or alternatively, the incoming portion of the audio stream can be processed and compared to a list of known on hold voices. As another example, the client device can determine a session is on hold based on detecting any music in an incoming portion of the audio stream. As yet another example, the client device can additionally or alternatively determine a session is on hold based on comparing a dialed number for the session to a list of phone numbers that are known for having callers placed on hold. For example, if a user calls "Hypothetical Utility Company" the client device can have the phone number associated with "Hypothetical Utility Company" stored as a number that usually places a caller on hold before the user can speak with a live representative. Furthermore, the list of phone numbers known for placing callers on hold can have a corresponding list of known on hold music and/or known on hold voices used by the number. Additionally or alternatively, a user can provide telephone numbers to the client device that typically place them on hold. With a user's permission, these user provided telephone numbers can be shared across client devices and can be added to the list of numbers that typically put people on hold on other client devices.

In some implementations, a user can indicate to the client device they have been placed on hold. In some versions of those implementations, the client device can detect that the user is likely on hold and provide user interface output (e.g., a selectable graphical element and/or an audible prompt) prompting the user if they would like to initiate an on hold client. If the user responds with affirmative user interface input (e.g., a selection of a selectable graphical element and/or a spoken affirmative input), the on hold client can be initiated. In some other versions of those implementations, a user can initiate the on hold client without the client device detecting the user is likely on hold and/or without the client device prompting the user. For example, the user can provide a spoken command (e.g., "Assistant, initiate on hold monitoring") to initiate the on hold client and/or can select a selectable graphical element whose presence isn't contingent on determining the user is likely on hold. In many implementations, a client device can monitor the audio stream of an entire voice communication session and detect if a user has been placed on hold at some point other than the beginning of the session. For example, a user can be interacting with a representative who places a user on hold while they transfer the session to a second representative. It is noted that in various implementations, the on hold client may operate in the background to detect when the voice communication session has been placed on hold, and may be "initiated" (e.g., transitioned to an "active" state) in which it them performs other aspects of the present disclosure (e.g., to detect when the voice communication session is no longer on hold).

When an on hold client is initiated, the on hold client can monitor at least an incoming portion of an audio stream of the voice communication session to determine when the voice communication session is no longer in an on hold status. When a session is no longer in the on hold status, the calling user can interact with a live person such as a representative at a company, a receptionist at a doctor's office, etc. Monitoring the audio stream of the voice communication session using the on hold client can be performed without direct interaction from the user (e.g., the user does not need to listen to the session while it is on hold).

In some implementations, the on hold client can determine when on hold music changes to a human voice. This human voice can sometimes be a recording of a person, so the on hold client determines if a recording is being played or if a live person has joined the session. In various implementations, an on hold client can ask the detected voice a question (referred to herein as a "response solicitation signal") and see if the voice responds to the question. For example, when a human voice is detected on the in the audio signal of the session, the on hold client can ask "Are you there?" and see if the voice responds to the question. An appropriate response to the question that the on hold client initiated indicates the hold is over and a second person has joined the session. In other implementations, the question is ignored and the on hold client can determine that a second person has not joined the session. For example, if an on hold client sends "Is anyone there?" as input to the audio signal and receives no response (e.g., instead on hold music continues to play), it can indicate the voice is a recording and the session is still on hold.

In some implementations, a "candidate end of hold event" can be used to determine when the hold might be over. In many implementations, this candidate end of hold event can initiate the on hold client sending a response solicitation signal over the audio channel of the session to see if a voice is human. This candidate end of hold event can be detected in a variety of ways. For example, a client device can detect when music stops playing and/or a person starts speaking. A change from music to a person talking can be determined using a variety of audio fingerprinting processes including Discrete Fourier transforms (DFT). A DFT can monitor blocks of the on hold session and determine when a sufficient change from one block compared to previous blocks is detected (e.g., detects the block when music stops playing and the change from music to a human voice in an additional block). In various implementations, one or more machine learning models can be trained and used to determine when an on hold session changes from audio to a human voice.

In many implementations, the threshold for determining when to ask a question (sometimes referred to as a "response solicitation signal") over the audio signal is low, and the on hold client will frequently ask a question since asking a question takes very little computational resources (and won't cause offense if a human is not currently at the other end of the session). In some of those implementations, a first machine learning model can be used to detect the candidate end of hold event and determine when to ask a question as input to the audio signal. Determining if a response is detected can require further computational resources, and in a variety of implementations a second machine learning model (in addition to a first machine learning model) can determine if a person has responded to the question. The second machine learning model used to detect whether a person has responded to the response solicitation signal can be stored locally on the client device and/or externally from the client device, e.g., on one or more remote computing systems often referred to as the "cloud." In some implementations, an on hold client can use a single machine learning model to combine all portions of dealing with a session on hold. In some of those implementations, the machine learning model can be used to process an audio stream and provide an output that indicates a likelihood that the session is on hold. In some versions of those implementations, a first easier to satisfy threshold for the likelihood can be utilized for determining a candidate end of the on hold status, and a second harder to satisfy threshold for the likelihood can be utilized for determining an actual end of the on hold status.

In a variety of implementations, one or more machine learning models can utilize an audio stream as input and the one or more models can generate a variety of output including a determination that a voice communication session has been placed on hold, a determination that a hold has potentially ended and a response solicitation signal should be transmitted as input to the audio stream of the voice communication session, and/or a determination the voice communication session hold has ended and it is unnecessary to send a response solicitation signal. In some implementations, a single machine learning model can perform all audio stream analysis for the on hold client. In other implementations, the output of different machine learning models can be provided to the on hold client. Additionally or alternatively, in some implementations portions of the on hold client can provide input to and/or receive output from one or more machine learning models while portions of the on hold client have no interaction with any machine learning model.

Additionally or alternatively, some voice communication sessions while on hold can verbally indicate an estimated remaining hold time. In many implementations, an on hold client can determine the estimated remaining hold time by analyzing natural language within the audio stream of the voice communication session, and can indicate to a user the estimated remaining hold time. In some such implementations, an estimated remaining hold time can be rendered to the user as a dialog box on a client device with a display screen such as pushing a pop up message that says "Your on hold call with "Hypothetical Water Company" has provided an updated remaining estimated hold of 10 minutes." This message can appear on a client device in a variety of ways including as part of the on hold client, as a new popup on the screen, as a text message, etc. Furthermore, a client device can additionally or alternatively render this information to user as a verbal indication using one or more speakers associated with the client device. In some implementations, an on hold client can learn the average amount of time a user spends on hold with a known number, and supply the average hold time (e.g., with a countdown) to the user when more specific estimates are unknown. Machine learning models associated with the on hold client can, when using the audio stream as input, learn when an estimated remaining hold length has been indicated in the audio stream and/or learn estimated on hold times for known numbers.

Machine learning models can include feed forward neural networks, Recurrent Neural Networks (RNN), Convolutional Neural Networks (CNN), etc. Machine learning models can be trained using a set of supervised training data with labeled output that corresponds to a given input. In some implementations, labeled audio streams of a set of previously recorded on hold voice communication sessions can be used as a training set for a machine learning model.

In a variety of implementations, the on hold client can utilize speaker diarization which can partition the audio stream of the session to detect an individual voice. Speaker diarization is the process of portioning an input audio stream into homogenous segments according to speaker identity. It answers the question of "who spoke when" in a multi-speaker environment. For example, speaker diarization can be utilized to identify that a first segment of an input audio stream is attributable to a first human speaker (without particularly identifying who the first human speaker is), a second segment of the input audio stream is attributable to a disparate second human speaker (without particularly identifying who the first human speaker is), a third segment of the input audio stream is attributable to the first human speaker, etc. When a specific voice is detected, the on hold client can query the voice to see if it receives a response. If the voice does not respond to the on hold client's question (e.g. "Hello, are you there?"), the on hold client can determine the identified voice is a recording and not an indication the hold is over. The particular voice can be learned by the on hold client as a recording of a voice, and that voice will be ignored if heard again during the voice communication session hold. For example, voice characteristic(s) of the particular voice and/or word(s) spoken by the particular voice can be identified and future occurrences of those voice characteristic(s) and/or word(s) in the voice communication session can be ignored. In other words, many times when a person is on hold, the recording played for the user will be a loop that includes music interrupted by the same recording (or one of several recordings). A voice identified as a recording within this on hold recording loop will be ignored if the voice communication session hold loops back to the same identified voice (i.e., not prompt the same voice again with a question). In some such implementations, the recorded voice can be shared across many client devices as a known voice recording.

In some implementations, the contents detected on the audio signal will be such a strong indicator that a human user is on the line that no response solicitation signal is necessary. For example, if the on hold client detects one of a list of keywords and/or phrases such as the caller's first name, the caller's last name, the caller's full name, etc., the on hold client can determine a live human user is on the line without asking any questions over the audio stream of the voice communication session. Additionally or alternatively, service representatives frequently follow a script when interacting with a user. The on hold client can monitor for the typical scripted greeting from a service representative of a particular company to identify the hold is over without sending a question over the audio stream. For example, suppose the user calls "Hypothetical Utility Company" at a particular number. The on hold client can learn the scripted response service representatives at "Hypothetical Utility Company" use when a service representative answers a voice communication sessions. In other words, the on hold client can learn service representatives at "Hypothetical Utility Company" begin voice communication sessions with a user after the end of a hold with a scripted message such as "Hello, my name is [service representative's name] and I work with Hypothetical Utility Company. How may I help you today?". Detecting the scripted message can trigger ending the on hold client without further need to query the voice and see if it is a live second user.

Once the on hold client detects an end of the hold, in a variety of implementations the on hold client can send a scripted message to the second user who is now also active in the session. For example, the on hold client can send a message saying "Hello, I represent Jane Doe. I am notifying her and she will be here momentarily." This message helps keep the second user on the line while the user who initiated the session is being notified of the end of hold. Additionally or alternatively, the voice communication session can be handed off to a further client instead of back to the user to interact with the session. In some such implementations, the further client can interact with the voice communication session using known information about the user and/or information the user provided to the further client regarding the specific voice communication session. For example, a user can provide the further client with information about when they want a dinner reservation at "Hypothetical Fancy Restaurant" and the further client can interact with the additional live human user to make the dinner reservation for the user.

In many implementations, the user who initiated the session is notified when the on hold client determines the on hold status has ended (i.e., the hold is over and a human is on the line). In some implementations, the user can select how they want to be notified at or around the same time the on hold client is initiated. In other implementations, the user can select how they want to be notified as a setting within the on hold client. The user can be notified using the client device itself. For example, the client device can notify the user by causing the client device to render a ring tone, causing the client device vibrate, causing the client device to provide spoken output (e.g., "you are no longer on hold"), etc. For instance, the client device can vibrate when the hold is over and the user can push a button on the client device to begin interacting with the session.

Additionally or alternatively, the on hold client can notify the user through one or more other client devices and/or peripheral devices (e.g., Internet of Things (IoT) devices), e.g., shared on the same network and/or forming part of the same coordinated "ecosystem" of client devices that are under the user's control. The on hold client can have knowledge of other devices on the network through a device topology. For example, if an on hold client knows the user is in a room with smart light(s), the user can select to be notified by changing the state(s) of smart light(s) (e.g., flashing light(s) on and off, dimming light(s), increasing the intensity of the light(s), changing the color of light(s), etc.). As another example, a user who is engaging with a display screen such as a smart television can select to be notified by a message appearing on the smart television display screen. In other words, a user can watch television while the session is on hold and can be notified by the on hold client via their television the hold is over so the user can reenter the session. As yet another example, the voice communication session can be made via a mobile telephone and the notification can be rendered via one or more smart speakers and/or other client device(s). In a variety of implementations, the client device used for the voice communication session can be a mobile telephone. Alternative client devices can be used for the voice communication session. For example, the client device used for the voice communication session can include a dedicated automated assistant device (e.g., a smart speaker and/or other dedicated assistant device) with the capability of making voice communication sessions for the user.

Implementations disclosed herein can enhance the usability of client devices by reducing the time a client device interacts with an on hold voice communication session. Computational resources can be conserved by running an on hold client process in the background of the computing device instead of the client device fully interacting with an on hold voice communication session. For example, many users will output on hold voice communication sessions through a speaker associated with the client device. Background monitoring of a voice communication session compared to outputting a session on a speaker requires less computational processing by a client device. Additionally or alternatively, performing an on hold process in the background of a client device can conserve the battery life of a client device when compared to outputting an on hold voice communication session through one or more speakers associated with the client device (which can further include both the output of an audio stream a user can hear when a client device is next to his or her ear as well as the audio stream of an on hold voice communication session outputted by an external speaker).

The above is provided as an overview of various implementations disclosed herein. Additional detail is provided herein regarding those various implementations, as well as additional implementations.

In some implementations, a method implemented by one or more processors is provided and includes detecting that a voice communication session is in an on hold status. The voice communication session is initiated by a client device of a calling user, and detecting that the voice communication session is in the on hold status is based at least in part on an audio stream of the voice communication session. The method further includes initiating an on hold client on the client device. Initiating the on hold client is during the voice communication session and is based on detecting that the voice communication session is in the on hold status. The method further includes monitoring, using the on hold client, the audio stream of the voice communication session for a candidate end of the on hold status. Monitoring the audio stream of the voice communication session occurs without direct interaction from the calling user. The method further includes detecting, based on the monitoring, the candidate end of the on hold status. The method further includes, in response to detecting the candidate end of the on hold status: sending, from the client device, a response solicitation signal as input to the audio stream of the voice communication session; monitoring the audio stream of the voice communication session for a response to the response solicitation signal; and determining that the response to the response solicitation signal indicates that the candidate end of the on hold status is an actual end of the on hold status. The actual end of the on hold status indicates that a human user is available to interact with the calling user in the voice communication session. The method further includes causing user interface output to be rendered in response to determining the actual end of the on hold status. The user interface output is perceptible by the calling user and indicates the actual end of the on hold status.

These and other implementations of the technology disclosed herein can include one or more of the following features.

In some implementations, detecting the candidate end of the on hold status includes detecting a human voice speaking in the audio stream of the voice communication session.

In some implementations, the client device is a mobile telephone or a standalone interactive speaker.

In some implementations, initiating the on hold client is responsive to user interface input provided at the client device by the calling user. In some versions of those implementations, the method further includes, in response to detecting that the voice communication session is in the on hold status: rendering, at the client device, a suggestion for initiating the on hold client. In those versions, the user interface input provided by the calling user is affirmative user interface input that is provided responsive to rendering the suggestion at the client device.

In some implementations, the on hold client is automatically initiated by the client device in response to detecting that the voice communication session is in the on hold status.

In some implementations, detecting that the voice communication session is in the on hold status includes detecting music in the audio stream of the voice communication session, and optionally determining the music is included in a list of known on hold music.

In some implementations, detecting that the voice communication session is in the on hold status is further based on determining a telephone number associated with the voice communication session is on a list of telephone numbers known for placing callers in the on hold status.

In some implementations, detecting the candidate end of the on hold status includes using audio fingerprinting to determine at least a threshold change in the audio stream.

In some implementations, determining that the response to the response solicitation signal indicates that the candidate end of the on hold status is the actual end of the on hold status includes: processing the response using at least one machine learning model to generate at least one predicted output; and determining the candidate end of the on hold status is the actual end of the on hold status based on the at least one predicted output. In some versions of those implementations, the at least one predicted output includes predicted text for the response, and determining the candidate end of the on hold status is the actual end of the on hold status based on the predicted output includes determining that the text is responsive to the response solicitation signal. In some additional or alternative versions of those implementations, the at least one predicted output includes a prediction of whether the response is a human voice, and determining the candidate end of the on hold status is the actual end of the on hold status based on the predicted output includes determining that the prediction of whether the response is a human voice indicates that the response is a human voice.

In some implementations, the method further includes, subsequent to determining that the response to the response solicitation signal indicates that the candidate end of the on hold status is the actual end of the on hold status: sending, from the client device, an end of hold message as input to the audio stream of the voice communication session. The end of hold message is audible to the human user and indicates that the calling user is returning to the voice communication session. In some of those implementations, the method further includes, subsequent to determining that the response to the response solicitation signal indicates that the candidate end of the on hold status is the actual end of the on hold status: ending the on hold client on the client device.

In some implementations, the user interface output that indicates the actual end of the on hold status is rendered via the client device, an additional client device that is linked to the client device, and/or a peripheral device (e.g., a networked light).

In some implementations, the method further includes identifying one or more pre-recorded voice characteristics of a pre-recorded human voice that is associated with a telephone number (or other unique identifier) associated with the voice communication session. In some versions of those implementations, determining that the response to the response solicitation signal indicates that the candidate end of the on hold status is an actual end of the on hold status includes: determining one or more response voice characteristics for the response; and determining that the one or more response voice characteristics differ from the one or more pre-recorded voice characteristics.

In some implementations, a method implemented by one or more processors is provided and includes receiving user interface input provided via a client device. The user interface input is provided by a calling user when a voice communication session is in an on hold status. The voice communication session is initiated by the client device, and a called party controls the on hold status of the voice communication session. The method further includes, in response to receiving the user interface input: monitoring audio generated by the called party during the voice communication session for a candidate end of the on hold status. The method further includes detecting, based on the monitoring, the candidate end of the on hold status. The method further includes, in response to detecting the candidate end of the on hold status: sending, by the client device, audible output for inclusion in the voice communication session. The audible output includes a recorded human voice speaking one or more words or a synthetically generated voice speaking the one or more words. The method further includes: monitoring audio generated by the called party following the audible output; and determining that the audio generated by the called party following the audible output satisfies one or more criteria that indicate the candidate end of the on hold status is an actual end of the on hold status. The actual end of the on hold status indicates that a human user is available to interact with the calling user in the voice communication session. The method further includes causing user interface output to be rendered in response to determining the actual end of the on hold status. The user interface output is perceptible by the calling user and indicates the actual end of the on hold status.

These and other implementations of the technology can optionally include one or more of the following features.

In some implementations, determining that the audio generated by the called party following the audible output satisfies one or more criteria includes: generating text by performing a voice-to-text conversion of the audio generated by the called party following the audible output; and determining that the text is responsive to the one or more words of the audible output.

In some implementations, the user interface input is an affirmative response to a graphical and/or audible suggestion rendered by the client device, where the suggestion is a suggestion to initiate an on hold client to monitor for an end of the on hold status. In some of those implementations, the suggestion is rendered by the client device in response to detecting, based on audio generated by the called party during the voice communication session, that the call is in the on hold status.

In some implementations, a method implemented by a client device that initiated a voice communication session is provided and includes, while the voice communication session is in an on hold status: monitoring an audio stream of the voice communication session for an occurrence of a human voice speaking in the audio stream; in response to detecting the occurrence of the human voice during the monitoring: sending a response solicitation signal as input to the audio stream; monitoring the audio stream for a response to the response solicitation signal; determining whether the response to the response solicitation signal is a human response that is responsive to the response solicitation signal; and when it is determined that the response is a human response that is responsive to the response solicitation signal: causing user interface output to be rendered that is perceptible by the calling user and that indicates an end of the on hold status.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

DETAILED DESCRIPTION

Figure 1:
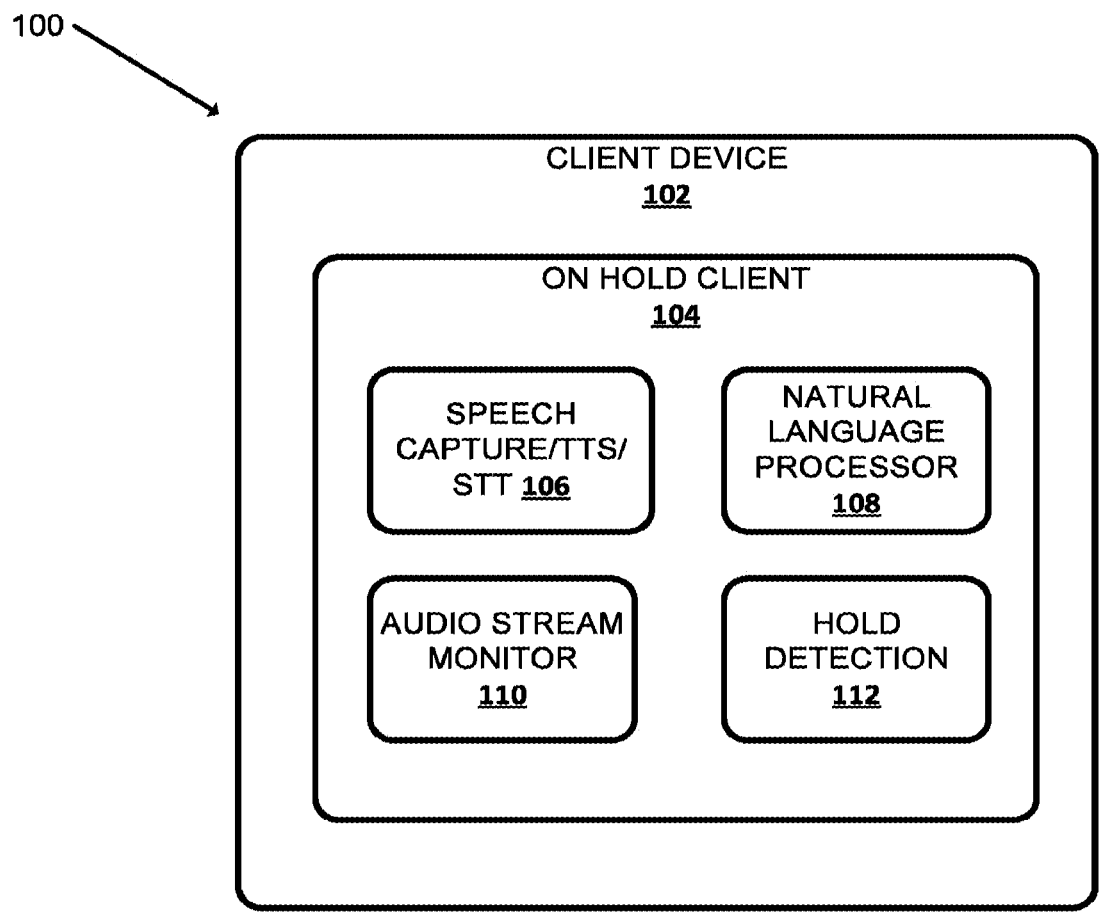
FIG. 1 is a block diagram illustrating an example environment in which various implementations can be implemented.

FIG. 1 illustrates an example environment 100 in which various implementations can be implemented. The example environment 100 incudes one or more client devices 102. For the same of brevity and simplicity, the term "on hold client" as used herein as "serving" a particular user may often refer to the combination of an on hold client 104 operated by the user on client device 102 and one or more cloud-based on hold components (not depicted).

Client device 102 may include, for example, one or more of: a desktop computing device, a laptop computing device, a touch sensitive computing device (e.g., a computing device which can receive input via touch from a user), a mobile phone computing device, a computing device of a vehicle of the user (e.g., an in-vehicle communications system), a standalone interactive speaker, a smart appliance such as a smart television, a projector, and/or a wearable apparatus of the user that includes a computing device (e.g., a watch of the user having a computing device, glasses of the user having a computing device, a virtual or augmented reality computing device, etc.). Additionally and/or alternative computing devices may be provided.

In some implementations on hold client 104 may engage in a dialog session in response to user interface input, even when that user interface input is not explicitly directed to on hold client 104. For example on hold client 104 may examine the contents of an audio stream of a voice communication session and/or the contents of user interface input and engage in a dialog session. For example, in response to certain terms being present in the audio stream of the voice communication session, in the user interface input, and/or based on other cues, the on hold client can engage in a dialog session. In many implementations, on hold client 104 may utilize speech recognition to convert utterances from users into text, and respond to the text accordingly, e.g., by providing search results, general information, and/or taking one or more response actions (e.g., launching on hold detection, etc.).

Each client device 102 may execute a respective instance of an on hold client 104. In a variety of implementations, one or more aspects of on hold client 104 can be implemented off the client device 102. For example, one or more components of on hold client 104 can be implemented on one or more computing systems (collectively referred to as a "cloud" computing system) that are communicatively coupled to client devices 102 via one or more local and/or wide area networks (e.g., the internet). Each of the client computing devices 102 may include one or more memories for storage of data and software applications, one or more processors for accessing data and executing applications, and other components that facilitate communication over a network. The operations performed by one or more computing devices 102 and/or on hold client 104 may be distributed across multiple computer systems. On hold client 104 may be implemented as, for example, computer programs running on one or more computers running in one or more locations that are coupled to each other through a network.

In many implementations, on hold client 104 may include a corresponding speech capture/text-to-speech ("TTS")/speech-to-text ("STT") module 106, a natural language processor 108, an audio stream monitor 110, a hold detection module 112, and other components.

On hold client 104 may include the aforementioned corresponding speech capture/TTS/STT module 106. In other implementations, one or more aspects of speech capture/TTS/STT module 106 may be implemented separately from the on hold client 104. Each speech capture/TTS/STT module 106 may be configured to perform one or more functions: capture a user's speech, e.g., via a microphone (not depicted) integrated in the client device 102; convert that captured audio to text (and/or to other representations or embeddings); and or convert text to speech. For example, in some implementations, because a client device 102 may be constrained in terms of computing resources (e.g., processor cycles, memory, battery, etc.), the speech capture/TTS/STT module 106 that is local to each client device 102 may be configured convert a finite number of different spoken phrases—particularly phrases that invoke on hold client 104—to text (or other forms, such as lower dimensionality embeddings). Other speech input may be sent to cloud-based on hold client components (not depicted), which may include a cloud-based TTS module and/or a cloud-based STT module.

Natural language processor 108 of on hold client 104 processes natural language input generate by users via client device 102 and may generate annotated output for use by one or more components of the on hold client 104. For example, the natural language processor 108 may process natural language free-form input that is generated by a user via one or more user interface input devices of client device 102. The generated annotated output includes one or more annotations of the natural language input and optionally one or more (e.g., all) of the terms of the natural language input.

In some implementations, the natural language processor 108 is configured to identify and annotate various types of grammatical information in natural language input. For example, the natural language processor 108 may include a part of speech tagger configured to annotate terms with their grammatical roles. Also, for example, in some implementations the natural language processor 108 may additionally and/or alternatively include a dependency parser (not depicted) configured to determine syntactic relationships between terms in natural language input.

In some implementations, the natural language processor 108 may additionally and/or alternatively include an entity tagger (not depicted) configured to annotate entity references in one or more segments such as references to people (including, for instances, literary characters, celebrities, public figures, etc.), organizations, locations (real and imaginary), and so forth. The entity tagger of the natural language processor 108 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 108 may additionally and/or alternatively include a coreference resolver (not depicted) configured to group, or "cluster", references to the same entity based on one or more contextual cues. For example, the coreference resolver may be utilized to resolve the term "there" to "Hypothetical Café" in the natural language input "I liked Hypothetical Café last time we ate there."

In many implementations, one or more components of the natural language processor 108 may rely on annotations from one or more other components of the natural language processor 108. For example, in some implementations, the named entity tagger may rely on annotations from the coreference resolver and/or dependency parsers in annotating all mentions to a particular entity. Also, for example, in some implementations the coreference resolver may rely on annotations from the dependency parser in clustering references to the same entity. In many implementations, in processing a particular natural language input, one or more components of the natural language processor 108 may use related prior input and/or other related data outside of the particular natural language input to determine one or more annotations.

In many implementations, on hold client 104 can interact with voice communication sessions on hold without any required interaction from the user who placed the session. In some additional or alternative implementations, the on hold client 104 can initiate an on hold process, terminate an on hold process, notify a user the voice communication session is no longer on hold, and/or pass the voice communication session which is no longer on hold to an additional client on the client device 102.

In many implementations, audio stream monitor 110 can be used by client device 102 and/or on hold client 104 to monitor the incoming and/or outgoing portions of an audio stream of voice communication sessions. For example, an incoming portion of an audio stream can include the audio portion a caller hears after making a voice communication session (e.g., another human's voice, music, etc.). Similarly, the outgoing portion an audio stream of a voice communication session can include what a caller says to another caller through the audio stream and/or other signals provided by the on hold client (such as a solicitation response query asking if another person is on the line). In some such implementations, client device 102 can use audio stream monitor 110 to detect when a voice communication session has been placed on hold and pass the on hold voice communication session to on hold client 104. Additionally or alternatively, on hold client 104 can monitor the audio stream of voice communication sessions and the on hold client 104 itself can determine when a voice communication session has been placed on hold. Signals in the audio stream detected by audio stream monitor 110 indicating a voice communication session has been placed on hold can include the detection of known on hold music, the detection of any music (since users are unlikely to play songs for each other over the voice communication session), a transition from a human voice to music, a transition from music to a human voice, etc.

Hold detection module 112 can use determinations about the audio stream of a voice communication session made by audio stream monitor 110 to determine when a voice communication session has been placed on hold, a voice communication session is no longer on hold, a predicted remaining wait time, etc. Hold detection module 112 can provide an indication to the user of the client device 102 when a session is no longer on hold as well as pass the voice communication session to an additional client on client device 102 to interact with the voice communication session (which may or may not require further interactions from the user).

Additionally or alternatively, a user can indicate to a client device 102 though a user interface that a voice communication session has been placed on hold and the user would like to begin an on hold process using on hold client 104. Hold detection module 112 can place a session on hold when it receives an affirmative indication through a user interface in client device 102 that a session has been placed on hold from a user either by recommending the session has been placed on hold and the user responds in an affirmative manner to initiate an on hold process and/or a user directly indicates a session has been placed on hold via a user interface in client device 102 to initiate an on hold process using hold detection module 112. In other implementations, hold detection module 112 can automatically initiate an on hold process when it detects a session in an on hold state.

In many implementations, hold detection module 112 can additionally or alternatively determine when a session is no longer on hold. In many implementations, a user can indicate how they wish to be notified at the end of an on hold process. For example, a user may wish to receive a voice communication session on a mobile computing system which indicates it is from the on hold number. Additionally or alternatively, a user can request connected smart devices within the same ecosystem of client device 102, such as a smart light, respond in a certain manner when the end of the hold is detected. For example, smart lights on the same network as the client device 102 can be instructed to flash on and off, dim in intensity, increase in intensity, change color, etc. to indicate an end of the hold of the voice communication session. Additionally or alternatively, a user watching a smart television can request a notification appear on the television when the end of the hold is detected.

Figure 2:
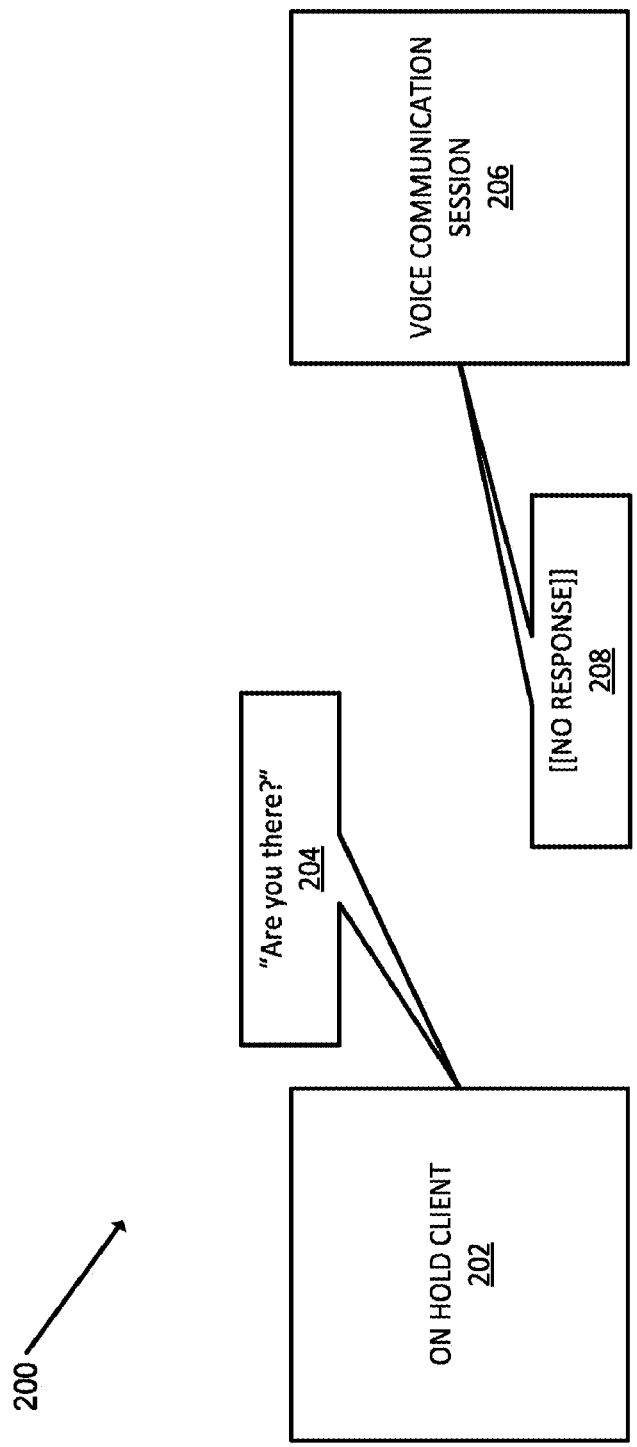
FIG. 2 is a diagram illustrating an example interaction between a client device and a voice communication session.
Figure 3:
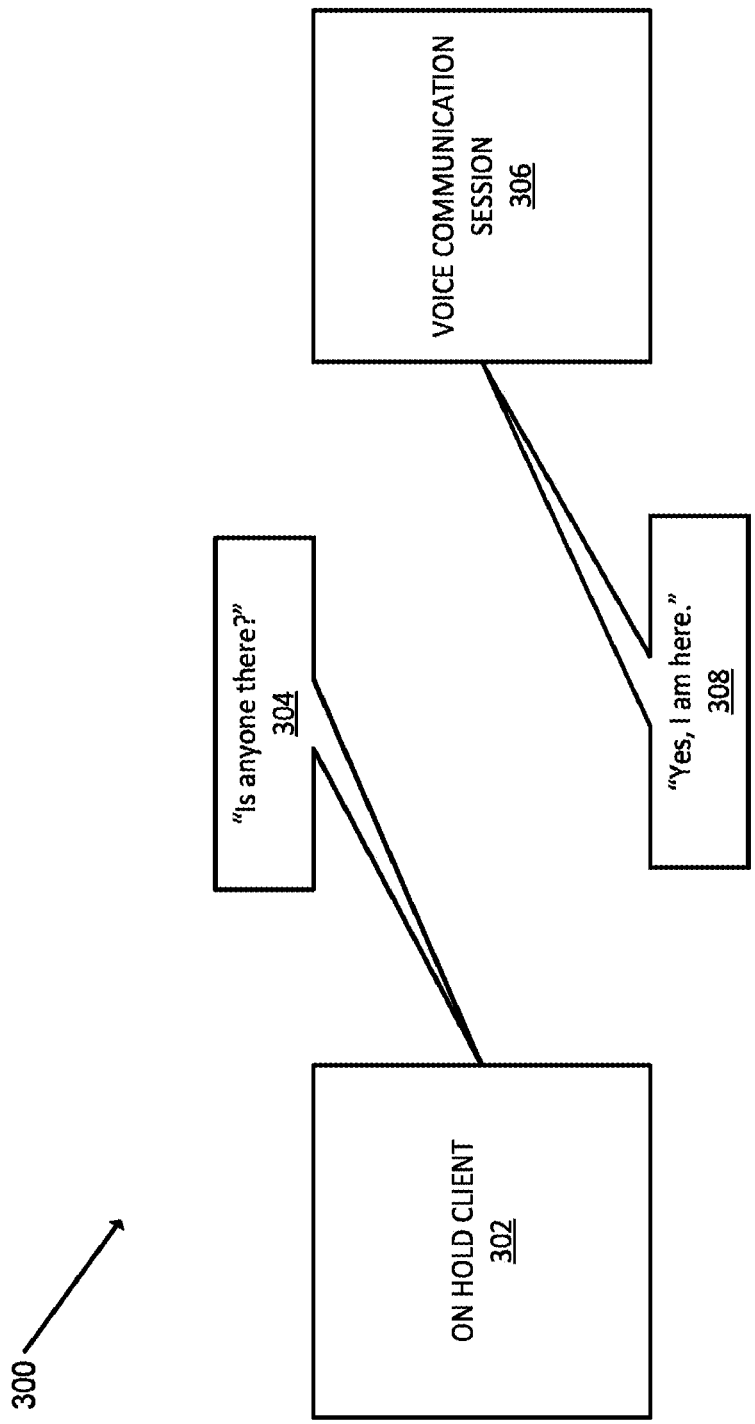
FIG. 3 is a diagram illustrating another example interaction between a client device and a voice communication session.
Figure 4:
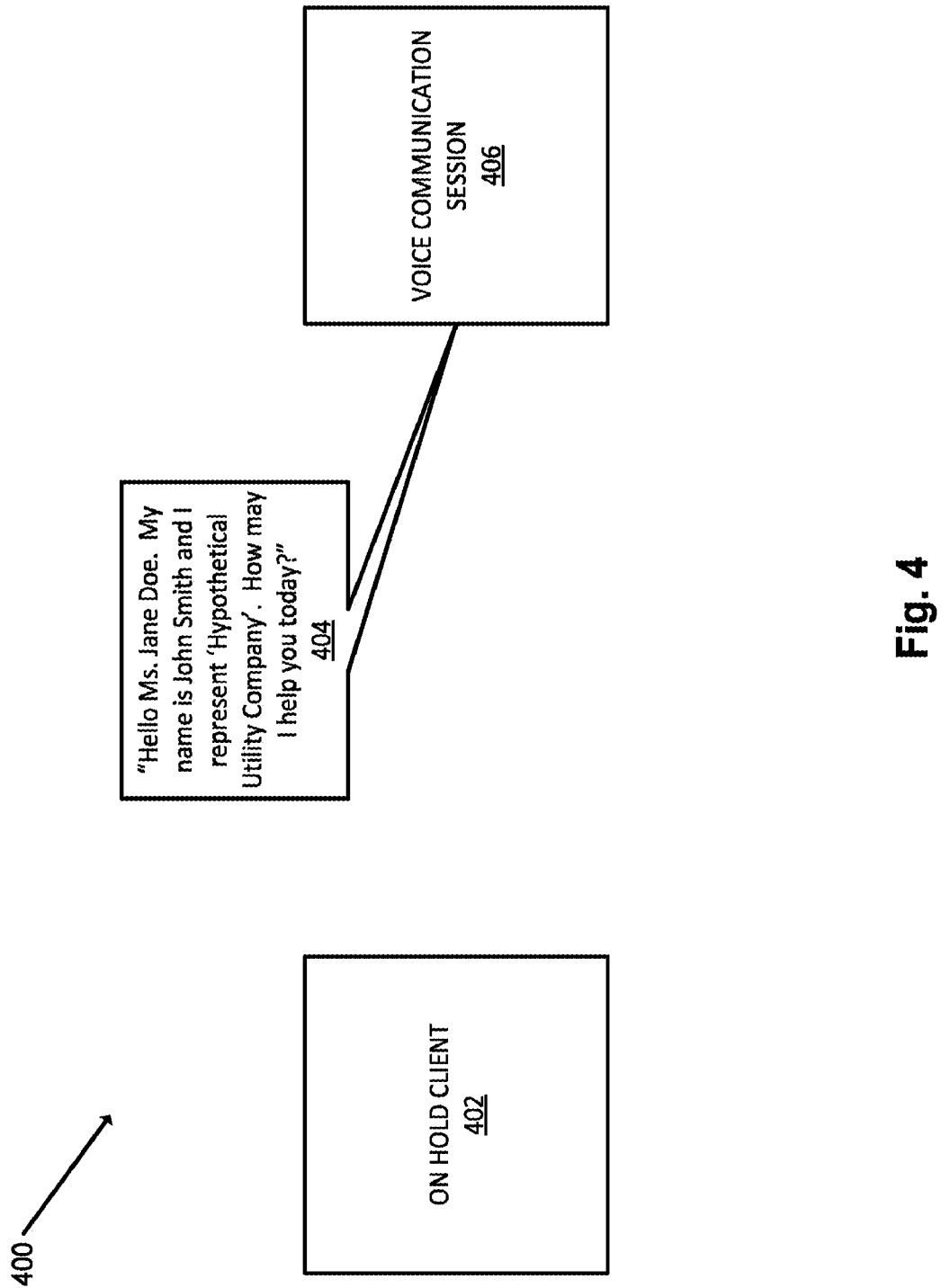
FIG. 4 is a diagram illustrating another example interaction between a client device and a voice communication session.

FIGS. 2, 3, and 4 each illustrate an interaction between an on hold client (such as on hold client 104 illustrated in FIG. 1) and a voice communication session. FIG. 2 illustrates image 200 which includes on hold client 202 interacting with a voice communication session 206 which is still on hold. In response to the detection of a potential (also referred to as a "candidate") end of the voice communication session hold, the on hold client 202 can send a response solicitation signal through the audio stream of the voice communication session 206 to determine if an additional live user has become is active in the session. In many implementations, an on hold client can determine a textual phrase to send as a response solicitation signal (e.g., "Are you there"). In some such implementations, a text-to-speech module (similar to speech capture/TTS/STT module 106 illustrated in FIG. 1) can convert the textual phrase into speech to provide as input to the audio stream.

In a variety of implementations, the potential end of the voice communication session hold can be detected by the on hold client 202 detecting any of a variety of signals in the audio stream of the voice communication session including a change in music, a change from music to a human voice (potentially a recorded voice as well as a live voice), signals detected by a variety of signals processing techniques such as Discrete Fourier Transforms, the output of neural network models, etc. A human voice can be analyzed as a signal and additionally or alternatively a speech-to-text module (similar to speech capture/TTS/STT module 106 illustrated in FIG. 1) can convert the human voice into text. Textual spoken language in an audio stream can additionally be analyzed by a natural language processor (such a natural language processor 108 as illustrated in FIG. 1) to determine the meaning of what is spoken by the human voice detected in the audio stream. The output of a natural language processor can further be used to determine a potential end of hold in the voice communication session. Additionally or alternatively, the output of natural language processor can be used in determining a live human user has entered the session. For example, the output of a natural language processor can provide input to one or more neural network models.

In some implementations, a neural network model can learn to identify one or more "voices" to ignore within a voice communication session. Voices can include one or more individual speakers, background music, background noise, etc. For example, one or more neural network models can include a recurrent neural network (RNN). The RNN can include at least one memory layer, such as a long short-term memory (LSTM) layer. Memory layers include one or more memory units to which input can be sequentially applied and, at each iteration of applied input, the memory unit(s) can be utilized to calculate a new hidden state based on the input of that iteration and based on a current hidden state (that can be based on input(s) of prior iteration(s)). In some implementations, a model can be used to generate speaker diarization results for any of various lengths of audio segments. As one example, the audio stream of the voice communication session can be divided into one or more data frames. Each data frame can be a portion of the audio signal, such as a 25 millisecond or other duration portion. Frame features can (or the frames themselves) can be applied, in sequence, as input to a trained speaker diarization model, to generate a sequence of outputs that each include a corresponding probability of each of N invariant speaker labels. For example, frame features of audio frame 1 can be applied initially as input to generate N probabilities, where each of the N probabilities corresponds to one of the N speaker labels; frame features of audio data frame 2 can be applied next as input to generate N probabilities, where each of the N probabilities is for a corresponding one of the N speaker labels; etc. It should be noted that while the generated N probabilities for audio data frame 2 are specific to audio data frame 2, they will be contingent on the processing of audio data frame 1, as the model can be a RNN model.

Additionally or alternatively, the N probabilities can indicate if a session has been placed on hold, if a session is still on hold, and/or if a potential end of hold signal has been detected. In many implementations, an estimated remaining hold time can be determined for the voice communication session (through knowledge the on hold client has of typical hold lengths for a particular called number and/or an estimated remaining hold time as indicated in audio stream of the voice communication session). An estimated remaining hold time can be additional input to a machine learning model in accordance with many implementations, where the machine learning model can be more likely to output a hold is over the shorter the remaining estimated hold time.

In other implementations, an on hold client can use knowledge of a potential remaining hold time to increase and/or decrease the threshold it uses to send a response solicitation signal (with or without the use of one or more machine learning models). For example, if a voice communication session is predicted to have 20 minutes remaining on hold, an on hold client can have a higher threshold to send a response solicitation signal. Similarly, a voice communication session predicted to only have a few minutes (for example 3 minutes) can have a lower threshold to send a response solicitation signal.

The detection of a potential end of the voice communication session hold can cause the on hold client 202 to send a response solicitation signal through the audio stream of the voice communication session to determine if an additional user has joined the voice communication session and the hold is over. For example, on hold client 202 can send a response solicitation signal 204, such as "Are you there". Additionally or alternatively, the response solicitation signal can be any of a variety of questions which would prompt a response such as "Is anyone there", "Hello, are you there", "Am I still on hold", etc.

In many implementations, the response solicitation signal can prompt the additional live human user who has ended the voice communication session hold for a predictable response. For example, a response to the response solicitation signal "Are you there" 204 can include "yes" and/or similar a similar word or phrase indicting an affirmative response (e.g., "Yeah", "Yup", as well as phrases which can include affirmative responses). Sending a response solicitation signal as input to the audio stream of the voice communication session can cost very little computationally. Additionally or alternatively, the likelihood of upsetting a recording (which can be played while a voice communication session is on hold) by asking the same question repeatedly is unlikely, so the threshold for sending the response solicitation query can be low. In other words, on hold clients in accordance with many implementations will frequently send a response solicitation signal because of few (if any) negatives from sending the response solicitation signal too frequently. Furthermore, if the on hold client fails to send a response solicitation signal when one should have been sent, the voice communication session can potentially be terminated and require a user to begin the on hold process with a telephone number again.

In many implementations, the response solicitation signal 204 can be sent though the audio stream of the voice communication session when the hold is not over. When a response solicitation signal is sent and the voice communication session hold is not over, no response 208 will be detected by on hold client 202 in the audio stream of voice communication session 206.

In many implementations, a recorded voice can reoccur while the voice communication session is on hold. In some such implementations, the recorded voice will not respond to the response solicitation signal, and the on hold client can learn to not send response solicitation signals to that voice in the future. For example, while on hold, a telephone number can play a recording including information about the number that was called (such as a website, business hours, etc.). This recording containing information about the number can be looped several times while the voice communication session is on hold. Once an on hold client determines this voice does not respond to the response solicitation signal, the on hold client can learn to not send additional response solicitation signals to that particular voice. In many implementations, an on hold client can learn to ignore a voice using one or more of a variety of signals generated by the particular voice (e.g., voice fingerprinting) including the pitch of the voice, identification of the voice itself, and/or a particular sequence of words the voice is saying.

FIG. 3 illustrates image 300 which includes on hold client 302 interacting with a voice communication session 306. In many implementations, on hold client 302 can send a response solicitation signal 304 such as, "Is anyone there?" as input to the audio stream of the voice communication session. A textual response solicitation signal provided by an on hold client can be converted into speech using a STT module (such as speech capture/TTS/STT module 106 illustrated in FIG. 1). For example, an on hold client can provide the textual phrase "Is anyone there" as a response solicitation signal. A STT module can convert this phrase into spoken language which can be transmitted as input to the audio signal of the voice communication session. Determining when to send a response solicitation signal 304 is described above with respect to FIG. 2. Image 300 further illustrates an on hold client receiving a response 308 "Yes, I am here" to the response solicitation signal and can make a determination the voice communication session is no longer on hold. In making a determination a voice communication session is no longer on hold, on hold client can convert the detected input to the audio stream and convert the input into text using a STT module (speech capture/ TTS/STT module 106 illustrated in FIG. 1). Furthermore, a natural language processor (such as natural language processor 108) can analyze the textual response to the response solicitation signal to provide a meaning of the textual response.

As described above with respect to FIG. 2, in many implementations the question "Is anyone there?" 304 generally will elicit an affirmative response from a second user, such as "Yes, I am here". In other implementations, the response solicitation signal can be phrased to generally elicit a negative response. For example, the question "Am I still on hold?" can elicit a negative response from a second user such as "No, you are not on hold". In some implementations, an on hold client can utilize typical responses to the specific response solicitation signal used in part when making a determination that the session is no longer on hold. In many implementations, the user who placed the voice communication session can be notified once the on hold client 302 determines the session is no longer on hold.

In some implementations, a user can be notified a session is no longer on hold. For example, a mobile telephone can ring and/or vibrate to simulate a new incoming session once the voice communication session hold is complete. Additionally or alternatively, networked devices in the proximity of the user can be used as notifications a voice communication session hold has ended. For example, a user placing a voice communication session can be in the proximity of a smart light. The smart light can flash, dim in intensity, increase in intensity, change colors, etc. to notify a user. Additionally or alternatively, a message can be pushed to a screen the user is interacting with including a mobile phone, a computing device, a television, etc. For example, a user watching a smart television in the same device topography as the client device used to initiate the voice communication session can receive a notification on the television when the session hold is over. In a variety of implementations, a user can select how to be notified as an on hold preference. Additionally or alternatively, a user can select how to be notified when the on hold process begins.

FIG. 4 illustrates image 400 which includes on hold client 402 and voice communication session 406. In many implementations, an on hold client can receive a very strong indication the voice communication session hold is over. In some such implementations, the on hold client will not send the response solicitation signal and instead can proceed with notifying the user the session is no longer on hold. The human voice detected in the audio stream can be converted to textual output using a STT module (speech capture/TTS/ STT module 106 illustrated in FIG. 1) which can be provided to a natural language processor (such as natural language processor 108 illustrated in FIG. 1) to provide the meaning of the text to the on hold client. For example, message 404 "Hello Ms. Jane Doe. My name is John Smith and I represent 'Hypothetical Utility Company'. How may I help you today?" can include strong indications the voice communication session is no longer on hold. For example, detection of a user's name (such as Jane Doe and/or Ms. Doe), detection of a phrase which indicates the additional users name (such as "My name is John Smith"), as well as other phrases (such as "How may I help you today?") can all individually and/or in combination cause an on hold client to determine a voice communication session hold is over without sending a response solicitation signal. In many implementations, a user can be notified as previously described when the on hold client determines the voice communication session is no longer on hold.

Figure 5:
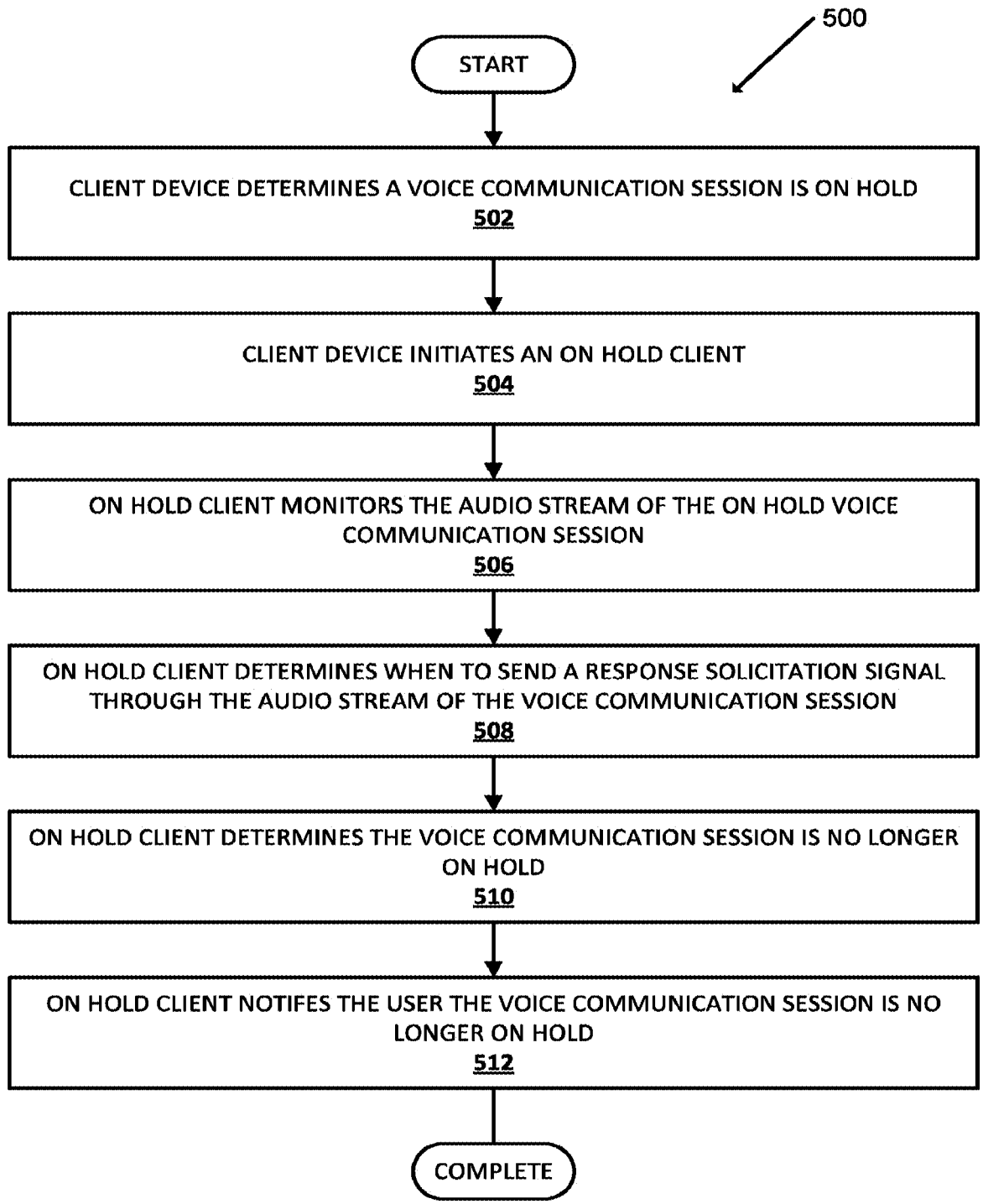
FIG. 5 is a flowchart illustrating an example process according to implementations disclosed herein.

FIG. 5 is a flowchart illustrating an example process 500 in accordance with many implementations disclosed herein. For convenience, the operations of the flowchart of FIG. 5 are described with reference to a system that performs the operations. This system may include various components of various systems, such as one or more components of client device 102. Moreover, while operations of process 500 are shown in a particular order, this is not meant to be limiting. One or more operations may be reordered, omitted, or added.

At block 502, the client device can optionally determine a voice communication session is on hold. As described above with respect to hold detection module 112 as illustrated in FIG. 1, a client device can determine a voice communication session is on hold in a variety of ways including detecting a known hold music, detecting any music, detecting a change from a human voice to music, direct input from the user the session has been placed on hold, determining the number called is a known number to generally place users on hold, as well as any of a variety of signal processing techniques including Discrete Fourier Transforms as well as a determination by one or more machine learning models associated with the on hold client in the client device.

At block 504, the client device initiates an on hold client similar to an on hold client 104 described above with respect to FIG. 1.

At block 506, the on hold client can monitor incoming and/or outgoing portions of the audio stream of the on hold voice communication session. In many implementations, an on hold client can monitor an audio stream in a manner similar to audio stream monitor 110 described above with respect to FIG. 1.

At block 508, the on hold client can determine when to send a response solicitation signal through the audio stream of the voice communication session. A variety of ways an on hold client can make a determination to send a response solicitation signal are described above with respect to FIG. 2. In many implementations, an on hold client can send one or more response solicitation signals, and keep sending response solicitation signals until the voice communication session is no longer on hold and/or the on hold client receives an indication from the user to end the on hold process (e.g., the user has become tired of waiting on hold and wants to end the on hold process and call the telephone number again later). In other implementations, an on hold client can send no response solicitation signals. For example, strong indicators can be detected indicating a session is no longer on hold (as described above with reference to FIG. 4) and an on hold client can determine a voice communication session is no longer on hold without sending a response solicitation signal.

At block 510, an on hold client can determine a voice communication session is no longer on hold. In various implementations, this determination can be made based on a received response to a response solicitation signal. In other implementations, this determination can be made using the strength of information monitored through the audio stream which is strong enough to indicate the voice communication session is no longer on hold without sending a response solicitation signal. Additionally or alternatively, an on hold client can send one or more response solicitation signals (which are not responded to) and then receive such a strong indication the voice communication session is no longer on hold that an additional response solicitation signal is not sent.

At block 512, the on hold client notifies the user the voice communication session is no longer on hold. A variety of ways an on hold client can notify a user of the end of a voice communication session hold are described above with respect to FIG. 1. Additionally or alternatively, an on hold client can pass the voice communication session to another client associated with the client device to handle the voice communication session in place of the user. For example, once an on hold client has determined a voice communication session is no longer on hold, the on hold client can pass the voice communication session to a second client which can interact with the additional person on the voice communication session on behalf of the user.

Figure 6:
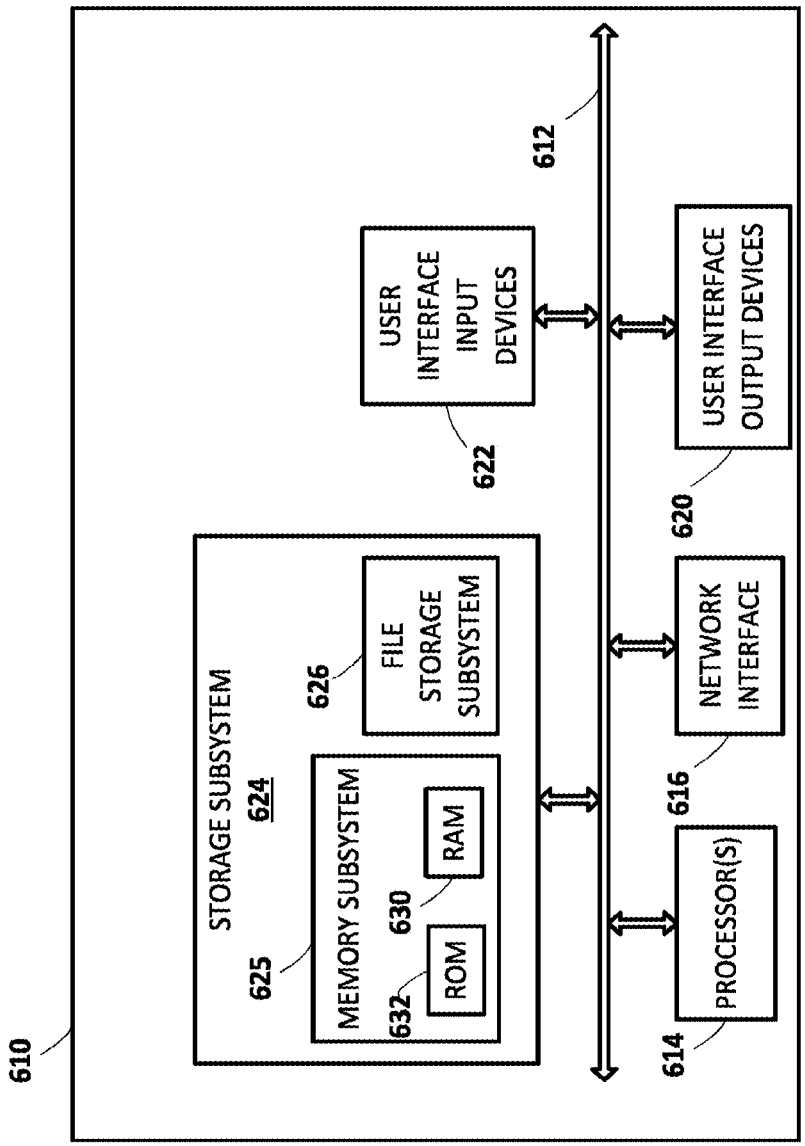
FIG. 6 is a block diagram illustrating an example architecture of a computing device.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of the client device illustrated in FIG. 1, process 500 illustrated in FIG. 5, any operation(s) discussed herein, and/or any other device or application discussed herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed:

1. A method implemented by one or more processors, the method comprising:
   prior to initiating a voice communication session:
   identifying a phone number provided by a calling user at a client device;
   determining whether the identified phone number is associated with an entity known to place calling users on hold;
   generating a predicted hold time associated the entity known to place calling users on hold;
   in response to determining that the identified phone number is associated with the entity known to place calling users on hold:
      causing user interface output to be rendered by the client device indicating the predicted hold time associated with the entity known to place calling users on hold;
   initiating the voice communication session;
   subsequent to initiating the voice communication session:
      detecting that the voice communication session is in an on hold status;
      determining to send, from the client device, a response solicitation signal as input to an audio stream of the voice communication session; and
      in response to determining a response to the response solicitation signal indicates an actual end of the on hold status, causing further user interface output to be rendered, wherein the further user interface output is perceptible by the calling user, indicates an end of the hold status, and includes audio output, vibration output, and/or visual output.

2. The method of claim 1, further comprising:
   prior to sending the response solicitation signal as input to the audio stream of the voice communication session:
      determining a threshold value based on the predicted hold time; and
   determining whether to send the response solicitation signal as input to the audio stream of the voice communication session based on determining whether a portion of the audio data stream satisfies the threshold value.

3. The method of claim 2, further comprising:
   in response to determining to send the response solicitation signal as input to the audio stream of the voice communication session:
      monitoring the audio stream of the voice communication session for a response to the response solicitation signal; and
      determining whether the response to the response solicitation signal indicates the actual end of the on hold status, where the actual end of the on hold status indicates that a human user is available to interact with the calling user in the voice communication session.

4. The method of claim 1, wherein the client device is a mobile telephone.

5. The method of claim 1, wherein detecting that the voice communication session is in the on hold status is based on the audio stream of the voice communication session.

6. The method of claim 1, wherein generating the predicted hold time associated with the entity known to place calling users on hold comprises:
   determining a typical hold time associated with the phone number; and
   generating the predicted hold time based on the typical hold time.

7. The method of claim 1, wherein initiating the voice communication session comprises identifying user interface input provided by the calling user, where the user interface input provided by the calling user is provided in response to the indication of the predicted hold time associated with the entity known to place calling users on hold.

8. A client device comprising:
   one or more processors, and
   memory configured to store instructions that, when executed by the one or more processors, cause the one or more processors to perform a method that includes:
   prior to initiating a voice communication session:
      identifying a phone number provided by a calling user at the client device;
      determining whether the identified phone number is associated with an entity known to place calling users on hold;
      generating a predicted hold time associated the entity known to place calling users on hold;
      in response to determining that the identified phone number is associated with the entity known to place calling users on hold:
         causing user interface output to be rendered by the client device indicating the predicted hold time associated with the entity known to place calling users on hold;
   initiating the voice communication session;
   subsequent to initiating the voice communication session:
      detecting that the voice communication session is in an on hold status;
      determining to send, from the client device, a response solicitation signal as input to an audio stream of the voice communication session; and
      in response to determining a response to the response solicitation signal indicates an actual end of the on hold status, causing further user interface output to be rendered, wherein the further user interface output is perceptible by the calling user, indicates an end of the hold status, and includes audio output, vibration output, and/or visual output.

9. The client device of claim 8, wherein the instructions further include:

prior to sending the response solicitation signal as input to the audio stream of the voice communication session:

determining a threshold value based on the predicted hold time; and determining whether to send the response solicitation signal as input to the audio stream of the voice communication session based on determining whether a portion of the audio data stream satisfies the threshold value.

10. The client device of claim 8, wherein the instructions further include:

in response to determining to send the response solicitation signal as input to the audio stream of the voice communication session:

monitoring the audio stream of the voice communication session for a response to the response solicitation signal; and determining whether the response to the response solicitation signal indicates the actual end of the on hold status, where the actual end of the on hold status indicates that a human user is available to interact with the calling user in the voice communication session.

11. The client device of claim 8, wherein the client device is a mobile telephone.

12. The client device of claim 8, wherein detecting that the voice communication session is in the on hold status is based on the audio stream of the voice communication session.

13. The client device of claim 8, wherein generating the predicted hold time associated with the entity known to place calling users on hold comprises:

determining a typical hold time associated with the phone number; and generating the predicted hold time based on the typical hold time.

14. The client device of claim 8, wherein initiating the voice communication session comprises identifying user interface input provided by the calling user, where the user interface input provided by the calling user is provided in response to the indication of the predicted hold time associated with the entity known to place calling users on hold.

* * * * *